United States Patent Office 3,524,588
Patented Aug. 18, 1970

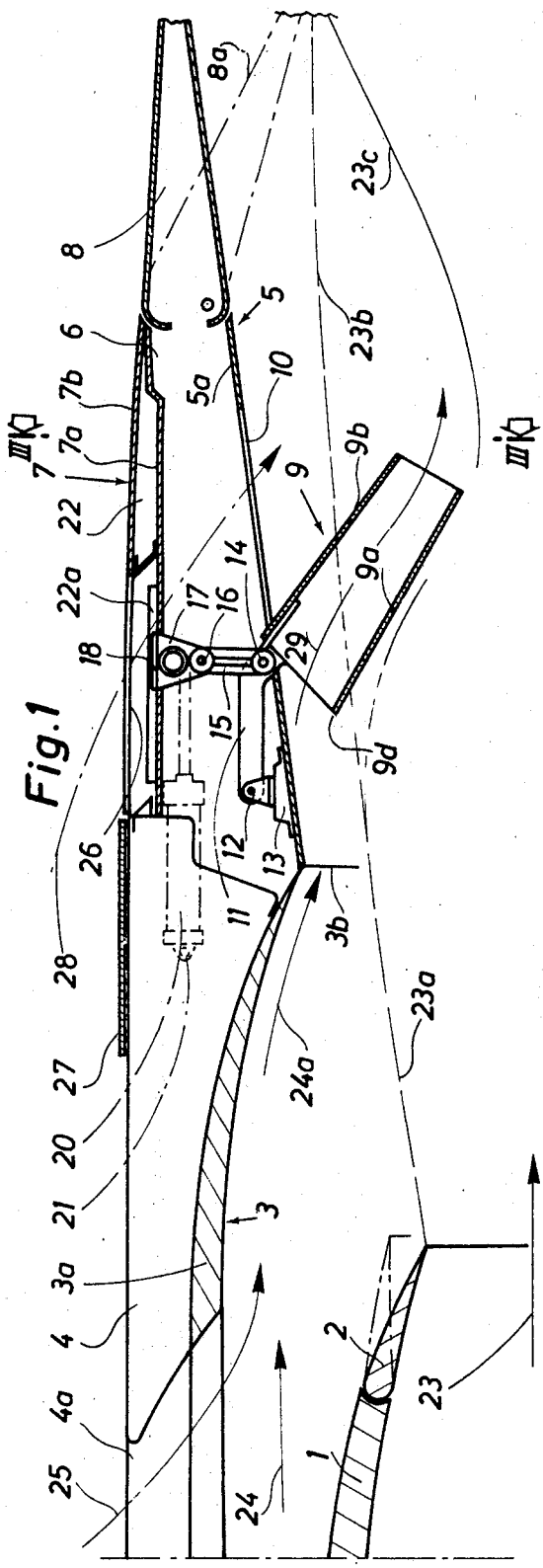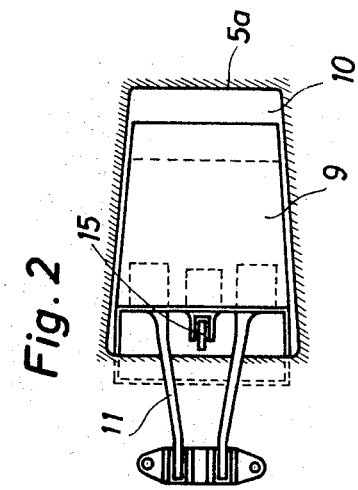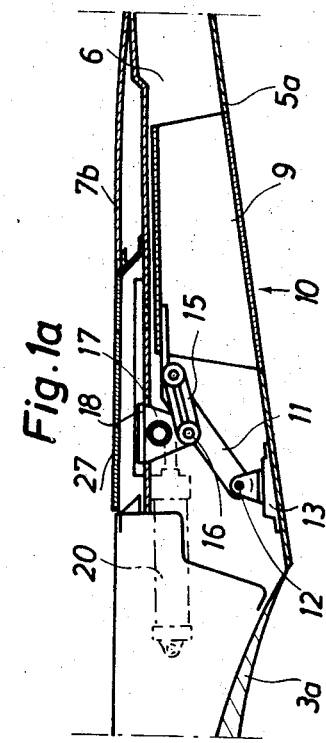

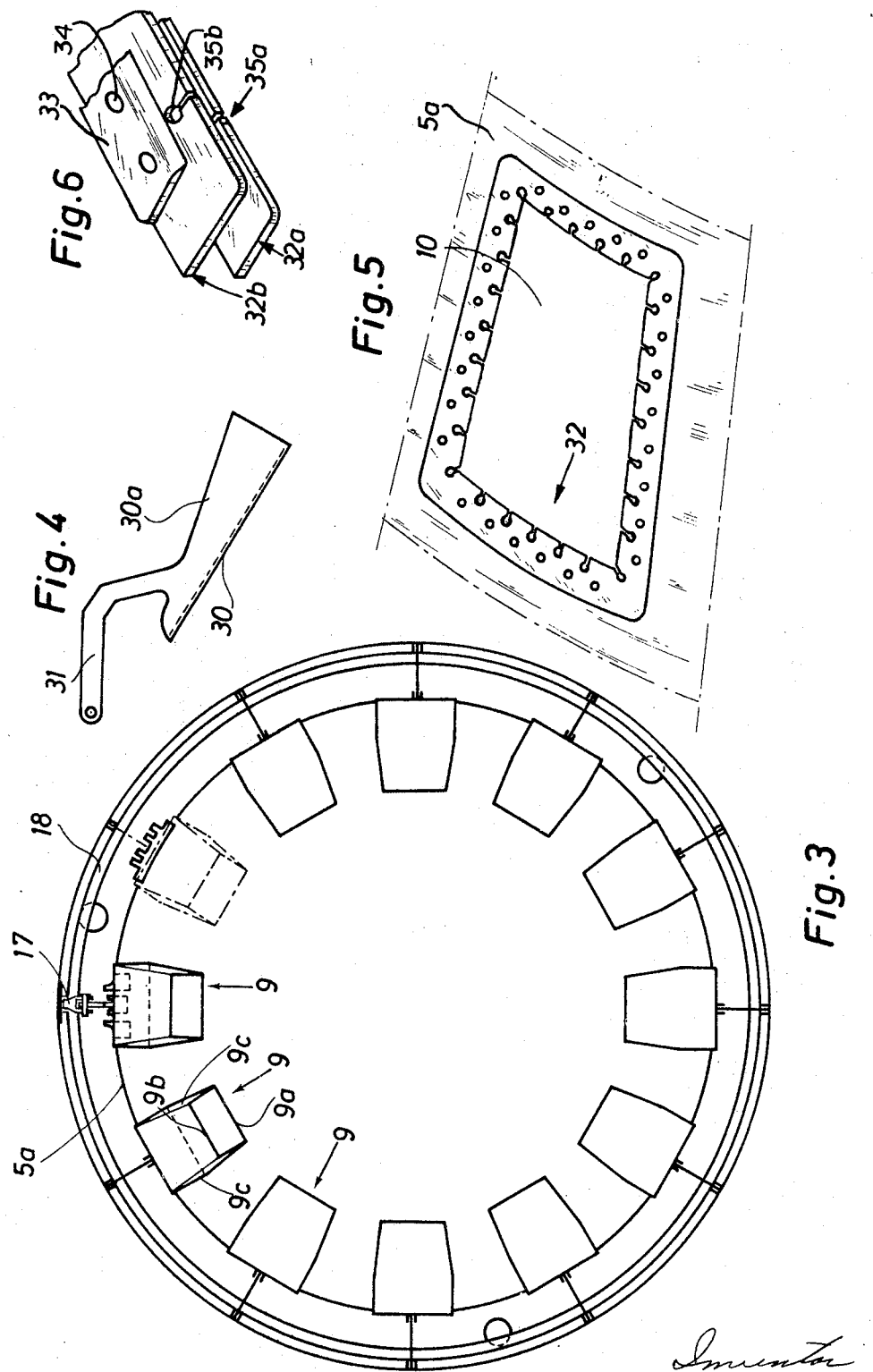

3,524,588
SILENCER FOR AIRCRAFT JET ENGINES
Jacques Georges Duval, Cretell, France, assignor to Société Nationale d'Etude et de Construction de Moteurs d'Aviation, Paris, France, a company of France
Filed Oct. 14, 1968, Ser. No. 767,393
Claims priority, application France, Oct. 19, 1967, 125,115
Int. Cl. B64d *33/04*
U.S. Cl. 239—265.13     5 Claims

---

ABSTRACT OF THE DISCLOSURE

In an aircraft jet engine nozzle in which a jet of hot gases is surrounded by an airflow in a divergent portion of the nozzle, the provision of a plurality of guide elements movable between an inoperative position wherein they are retracted into the wall of the divergent portion and an operative position wherein they are shifted towards the nozzle axis and incline downstreamly towards the said axis, with their upstream edges spaced inwardly from the said wall in order to gather some of the airflow and guide it into the jet to produce a silencer effect, while uncovering openings in the said wall to supply a supplemental flow of air around the jet downstream of the guide elements.

---

Modern aircraft jet engines, which develop very high power, are characterised by very substantial mass flows, very high temperatures and very high expansion ratios. Aircraft equipped with jet engines having these features are very noisy during the take-off and climb-away phases and it is consequently desirable to reduce the noise level at or near the ground.

In addition, the constant search for increased power has meant that for jet engines of supersonic aircraft, a convergent-divergent nozzle design has been chosen to obtain optimum performance. However, a nozzle of this kind requires additional air during take-off in order to provide aerodynamic centering of the gas flow which provides the thrust and in order to avoid any thrust losses of the kind due to excessive expansion as a consequence of the tendency of the jet to attach to the wall of the divergent portion of the nozzle (with the consequent instability which this creates).

The invention makes it possible to dilute the hot gas flow responsible for generating the thrust in order to produce a silencing effect, whilst at the same time providing an additional air supply which reduces the drag of the device. The device responsible for producing this dilution and therefore the silencing effect, is used only when the aircraft is on the ground or close thereto, and is thus retracted during the remainder of the flight, consequently avoiding any in-flight thrust loss, in particular in the cruising state, where the silencing effect is no longer required.

In accordance with the present invention, the convergent-divergent nozzle, which in its exit zone contains the flaps which enable its exit cross-section to be adapted to accord with optimum operation of the engine and is supplied with a flow of hot gas for generating the thrust, said hot gas flow being surrounded by a cold airflow, comprises between the throat and the said flaps, an arrangement of lobes which are capable of being displaced towards the axis of the nozzle and in so doing open in the wall of the divergent portion orifices which provide access to the external air in order to produce the additional air supply, said lobes, in the displaced position, having their upstream edges in each case spaced away from the wall of the divergent portion and being inclined downstream towards the nozzle axis.

The said lobes are moved into the displaced position, during the take-off phase. In this position, they split the hot gas flow and deflect some of the airflow which then dilutes the split-up gas flow, thus creating a silencing effect whilst the additional air entering through the openings uncovered by the said displaced lobes, surrounds the jet downstream thereof and serves to centre the jet.

The lobes are then returned to the normal flight condition, in which their internal faces close off the openings in the wall of the divergent portion of the nozzle and produce continuity thereof.

The following description with reference to the accompanying drawings is given by way of example only and illustrates how the invention may be put into effect. In the drawings:

FIG. 1 illustrates a nozzle equipped with a device in accordance with the invention, seen in longitudinal half-section;

FIG. 1*a* is a fragmentary view similar to that of FIG. 1, showing a lobe in the retracted position;

FIG. 2 is a plan view of a portion of the divergent section of the wall, illustrating an opening uncovered by a lobe;

FIG. 3 is a sectional view on the line III—III of FIG. 1;

FIG. 4 is a side elevation of a lobe which can be used as a variant form of the lobes shown in the preceding figures;

FIG. 5 is a perspective view of part of the wall of the divergent portion of a nozzle, showing a sealing arrangement for the openings; and FIG. 6 is a fragmentary view on a larger scale, showing how the seals are assembled.

The nozzle illustrated in FIG. 1 comprises a convergent primary nozzle 1 whose exit section can be regulated by the flaps 2 which, in order to control the load on the engine, can adopt any position between the position shown in full line and the position shown in broken-line. The primary nozzle 1 is surrounded by a concentric casing of larger diameter forming a secondary nozzle 3, 5 extending downstream and containing a convergent portion 3 and a divergent portion 5. The convergent portion 3 is made up of a wall 3*a* fixed to a structure 4, the openings 4*a* being formed in said wall and in said structure. The convergent wall 3 is connected along a line 3*b*, forming the throat, with the wall 5*a* of the divergent portion. The wall 5*a* is constituted by a casing which internally defines a hollow space 6 externally defined by a faired wall indicated in toto by the reference 7 and constituted by two coaxial casings 7*a*, 7*b*. At the rearward extremity of the divergent portion 5 there are provided secondary flaps 8 which, in the usual manner, enable the nozzle to be adapted for maximum performance.

Between the throat 3*b* and the flaps 8 there are located in a ring around the divergent portion of the secondary nozzle, a plurality of guide elements or lobes 9 each in the form of an internal wall 9*a* and an external wall 9*b*, connected together by two side walls or cheeks 9*c* (see FIG. 3). The wall 5*a* of the divergent portion contains a plurality of openings 10 and the lobes 9 are so mounted as to be able to deploy between a normal flight condition, shown in FIG. 1*a*, in which they are retracted into the hollow space 6 and in which each one of them closes off an opening 10, and an operative position or silencing position, shown in FIG. 1, in which they are displaced towards the axis of the nozzle and inclined towards the rear in the direction of said axis, the upstream edge 9*d* of their internal wall 9*a* and their side walls 9*c*, being spaced away from the wall 5*a* towards the interior of the divergent portion of the nozzle.

To this end, each of the lobes 9 is fixed to the end of a cranked lever 11 whose other end is mounted to pivot about a fulcrum 12 fixed perpendicularly to the nozzle axis in a yoke 13 attached to the wall 5a. The cranked portion of the lever 11 is articulated at 14 to one end of a link 15 whose other end is articulated at 16 to a yoke 17 attached to a ring 18 able to slide parallel to the axis of the nozzle, between the normal position shown in FIG. 1a and the operative position shown in FIG. 1, this under the influence of a jack 20, whose cylinder is carried at the point 21 by the structure 4. The ring 18 is guided, during this displacement, in grooves 22a formed in longitudinal elements 22 fixed between the elements 7a and 7b of the wall 7.

In order to displace the lobes from the normal position shown in FIG. 1a, to the operative position of FIG. 1, a pressurised fluid is fed into the jacks 20, the piston rods of which force the ring 18 carrying the yoke 17, in the downstream direction of the nozzle. During this movement, the link 15 pivots about the pin 16, into the substantially radial position shown in FIG. 1. The joint 14, which was spaced further away from the nozzle axis than the joint 16, moves towards said axis and in so doing moves the lever 11, causing it to pivot about its fulcrum pin 12 and carry the lobe 9 into the position shown in FIG. 1.

It should be pointed out that the kinematic linkage which has just been described makes it possible to retract from the position shown in FIG. 1 in which the thick obstacles constituted by the lobes 9 and their side plates 9c are spaced away from the wall of the divergent portion in the direction towards the nozzle axis to a point external of said divergent portion and to completely seal off the openings 10.

It will be observed (FIG. 3) that the lobes 9 are not in contact with one another in their operative position. The wall 5a of the divergent portion has full sections between the openings 10.

The arrow 23 schematically illustrates the flow of hot gas, forming a jet exiting from the primary nozzle 1. The annular space formed between the primary nozzle and the secondary nozzle, is supplied with air in accordance with the arrows 24, 25, in order to constitute an airflow 24a around the jet. In the external wall 7, there are openings 26 which are closed off in normal flight by the flaps 27 which can be retracted by some suitable means. These flaps 27 can be retracted for example by sliding longitudinally on the wall 7, or by being swung towards the interior or exterior. The control of these flaps 27 will advantageously be synchronised with the control of the lobes 9.

When the aircraft is flying at low Mach number, for example during the take-off phase, the openings 4a will of course be open; the openings 26 are likewise open as FIG. 1 shows, and the openings 10 are uncovered by the lobes 9 which are in the operative position. The external air passing through the openings 26 and 10 in the direction of the arrow 28, enters the divergent portion of the nozzle to the rear of the lobes 9. Part of the flow 24a passes between the lobes 9 and mixes with the flow of external air 28, and the rest of the flow 24a is scooped out by the lobes 9 and passed through the interior thereof as indicated by the arrow 29; in these conditions of flight, as obtaining at take-off, that is to say at low Mach number, and with the lobes 9 in the operative position, the secondary flaps 8 are swung into the position shown in broken-line in 8a. Taking into account the partial pressures of the various flows involved, and the appropriate position of the lobes 9, the hot gas flow has a boundary, between the lobes 9, substantially defined by the line 23a, 23b extending from the exit of the primary nozzle 1 to the exit of the terminal flaps, the boundary at the lobes 9 themselves, being indicated by the line 23a, 23c.

It will be understood that the silencing effect is obtained by means of the breaking up of the jet by the lobes 9, which deflect some of the airflow 24a and guide it into the primary airflow 23. The external airflow 28 mixed with that part of the flow 24a which passes between the lobes 9, surrounds the jet downstream of these lobes and flows into the potential vacuum zone behind the faces 9b, eliminating, or at any rate reducing, the drag losses.

In the embodiments described in relation to FIGS. 1 to 3, the lobes 9 are substantially in the form of tubes open at both ends. As a variant form, lobes of the kind shown in FIG. 4 can be used which simply have an internal wall 30 and two side plates 30a which are fixed to a cranked link 31 similar to the links 11 of the preceding figures.

In normal flight, the lobes occupy the position shown in FIG. 1a, in which they are completely retracted into the hollow space 6 to maintain the continuity of the wall 5a of the divergent portion. Moreover, they can appropriately seal off the wall 5a of the divergent portion. In this fashion, they enable optimum efficiency of the divergent portion of the nozzle to be achieved in cruising flight conditions.

By way of example, one of the means by which said sealing can be achieved, is shown in FIGS. 5 and 6. Around the edges of the openings 10, there are fixed sealing elements 32 constituted by two superimposed flexible strips 32a, 32b attached by a clamping plate 33 which is fixed to the wall 5a by rivets 34. The clamping plates 32a and 32b contain respective slots 35a and 35b thus increasing the flexibility of the strips without allowing any leakage.

I claim:

1. An aircraft jet engine nozzle comprising a primary nozzle for the ejection of a jet of hot gases; a secondary nozzle coaxial with and disposed around the primary nozzle and delimiting therewith an annular space, said secondary nozzle extending downstream of the primary nozzle and forming a convergent portion and a divergent portion, at the downstream extremity of which latter there is a plurality of flaps for verying the exit cross-section of the nozzle to suit the particular state of operation of the jet engine; means for supplying air into the annular space in order to produce an airflow around the jet; a plurality of guide elements distributed around the periphery of the divergent portion, each of said elements having an internal wall with an upstream edge and a downstream edge, said guide elements being movable between an inoperative position, in which they are retracted into the wall of the divergent portion, and an operative position, in which the said internal walls project away from the wall of the divergent portion and incline in the downstream direction towards the nozzle axis, with their upstream edges spaced away from the wall of the divergent portion in order to gather some of the airflow and guide it into the jet; a plurality of openings in the wall of the divergent portion, designed to be closed off by the guide elements when in the inoperative position, and to be uncovered thereby when in the operative position, and means for supplying air through said openings in order to produce increased airflow around the jet downstream of the guide elements; and means for displacing said guide elements between their operative and inoperative positions.

2. A nozzle according to claim 1, further comprising sealing means designed to co-operate with the guide elements in the inoperative position, in order to seal the openings.

3. A nozzle according to claim 2, in which each guide element has an external wall connected to the internal wall by side plates.

4. A nozzle according to claim 2, in which each guide element has two side walls directed towards the exterior and connected to the internal wall.

5. A nozzle according to claim 1, in which each guide element is fixed to one end of the cranked lever mounted to pivot radially in a free internal space within the wall of the secondary nozzle, means provided within said free space in order to simultaneously cause all said levers to pivot and displace the guide elements between the inoperative position and the operative position, through the openings.

References Cited

UNITED STATES PATENTS

| | | | |
|---|---|---|---|
| 2,847,823 | 8/1958 | Brewer | 239—265.29 |
| 2,986,002 | 5/1961 | Ferri | 239—265.13 |
| 3,333,772 | 8/1967 | Bruner | 238—265.13 |
| 3,346,193 | 10/1967 | Tumicki | 239—265.41 |
| 3,380,663 | 4/1968 | Jumelle | 239—265.41 |
| 3,436,020 | 12/1966 | Duthion et al. | 181—33.221 |

LLOYD L. KING, Primary Examiner

U.S. Cl. X.R.

181—33.221; 239—265.29, 265.41